US008607781B2

(12) United States Patent
Hermann et al.

(10) Patent No.: US 8,607,781 B2
(45) Date of Patent: Dec. 17, 2013

(54) PARTIALLY TRANSPARENT SUN COLLECTOR HAVING A SUN PROTECTION FUNCTION

(75) Inventors: Michael Hermann, Freiburg (DE); Tilmann Kuhn, Hinterzarten (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 1208 days.

(21) Appl. No.: 12/306,039

(22) PCT Filed: Jun. 27, 2007

(86) PCT No.: PCT/DE2007/001136
§ 371 (c)(1),
(2), (4) Date: Apr. 29, 2009

(87) PCT Pub. No.: WO2008/000236
PCT Pub. Date: Jan. 3, 2008

(65) Prior Publication Data
US 2009/0241941 A1    Oct. 1, 2009

(30) Foreign Application Priority Data

Jun. 30, 2006    (DE) .................. 10 2006 030 245

(51) Int. Cl.
*F24J 2/24* (2006.01)
(52) U.S. Cl.
USPC ..................... 126/660; 126/701; 126/702
(58) Field of Classification Search
USPC ......... 126/558, 559, 560, 561, 701, 702, 703, 126/658, 659, 660, 661; 359/591–598, 601, 359/614, 613; 52/173.3
See application file for complete search history.

(56) References Cited

U.S. PATENT DOCUMENTS

| 2,518,044 | A | * | 8/1950 | Mattison | 359/596 |
| 3,935,897 | A | * | 2/1976 | Pulver | 165/49 |
| 3,993,125 | A | * | 11/1976 | Rhodes | 165/153 |
| 4,014,313 | A |   | 3/1977 | Pedersen | 126/270 |
| 4,248,210 | A |   | 2/1981 | Ortega | 126/444 |
| 4,337,754 | A | * | 7/1982 | Conger | 126/618 |
| 4,429,545 | A |   | 2/1984 | Steinberg | 62/235.1 |
| 4,534,336 | A |   | 8/1985 | Ladriere | 126/431 |
| 5,413,091 | A | * | 5/1995 | Bourke | 126/598 |
| 5,692,491 | A | * | 12/1997 | Christensen et al. | 126/628 |
| 5,886,313 | A | * | 3/1999 | Krause et al. | 219/121.6 |
| 6,170,566 | B1 | * | 1/2001 | Blumel et al. | 165/152 |
| 7,287,878 | B2 | * | 10/2007 | Miller | 362/282 |
| 2003/0168056 | A1 | * | 9/2003 | Fidler | 126/628 |
| 2009/0195864 | A1 | * | 8/2009 | Kuhn et al. | 359/350 |

FOREIGN PATENT DOCUMENTS

| AU | 611084 | 6/1991 | ............... F28F 1/00 |
| DE | 29 49 549 A1 | 6/1981 | ............. E04H 17/00 |
| DE | 30 10 016 A1 | 10/1981 | ................ F24J 3/02 |
| DE | 34 40 275 | 5/1986 | ................ F24J 2/26 |

(Continued)

*Primary Examiner* — John K Fristoe, Jr.
*Assistant Examiner* — Matthew W Jellett
(74) *Attorney, Agent, or Firm* — Renner Kenner Greive Bobak Taylor & Weber

(57) ABSTRACT

The present invention relates to a sun collector comprising a flat absorber body (1) on or in which one or more absorber channels (17) for the flow of a heat transfer medium are configured. In areas which are not occupied by the one or more absorber channels (17), the absorber body (1) of the present sun collector has penetrable openings (4, 10, 13) for sunlight to pass through. The sun collector therefore provides the double function of a sun collector with a partially transparent sun protection device.

37 Claims, 15 Drawing Sheets

(56) References Cited

FOREIGN PATENT DOCUMENTS

| DE | 43 22 653 | 1/1995 | ................ E04B 1/76 |
| DE | 100 05 326 A1 | 8/2001 | ................ F24J 2/42 |
| EP | 0 330 701 | 4/1985 | ................ F24J 2/04 |
| EP | 1 376 026 | 1/2004 | ................ F24J 2/04 |
| FR | 2 068 890 | 9/1971 | ................ E06B 9/00 |
| FR | 2 679 019 | 1/1993 | ................ F24J 2/30 |
| GB | 2 000 273 | 1/1979 | ................ F24J 3/02 |
| WO | WO 99/10934 | 3/1999 | ............ H01L 31/058 |

\* cited by examiner

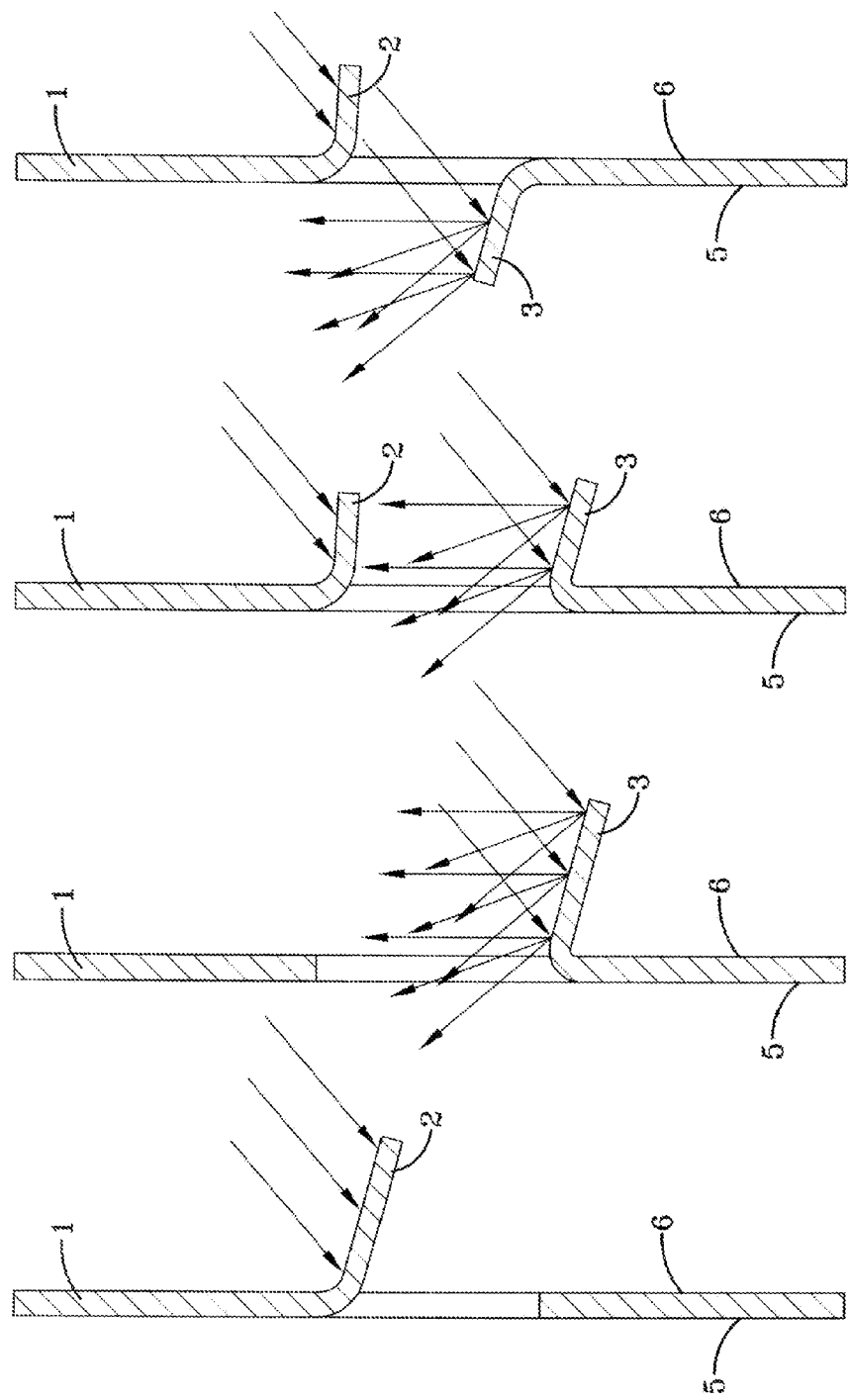

PARTIALLY TRANSPARENT SUN COLLECTOR HAVING A SUN PROTECTION FUNCTION

TECHNICAL FIELD OF APPLICATION

The present invention relates to a sun collector comprising a flat absorber body on or in which one or more absorber channels for the flow of a heat transfer medium are configured.

Sun collectors are used in manifold ways for heating hot water or for assisting heating. Flat collectors are a usual design here in which a flat, usually metallic, absorber absorbs solar radiation and transfers the heat produced to a heat transfer medium which flows through a channel structure attached to the absorber or integrated therein. Known sun collectors usually have spectrally selective coatings which readily absorb the solar radiation but emit little infrared radiation to keep the heat losses low. Visually they appear black to bluish. Along with the usual installation on the roof, facade collectors are also known which are integrated in the external walls of buildings. In the case of facade collectors, aspects of the aesthetics and integration in the building play an important role, especially as they are significantly more visible than installations on the roof. They can result in a cost reduction by joint usage of components and as a design element of the facade. In addition, in the event of low irradiation, they offer the possibility of being used as a passive solar element, i.e. without through-flow.

In facade construction, especially in office buildings, the proportion of glazed areas has increased continuously over the last few years. In addition to the positive effect of a greater supply of daylight, this can, however, also lead to overheating of office areas, which is why sufficient sun protection must be provided. This sun protection should on the one hand allow at least partially a view towards the outside and result in good illumination of the rooms, but on the other hand should also provide sufficient sun protection and avoid glare.

PRIOR ART

Known from DE 3620285 A1 is a device which combines the function of a sun collector with the function of a sun protection device. The device comprises a Venetian blind with movable slats in which the individual slats are configured as solar absorbers with an integrated absorber channel. However, such a system is expensive and liable to breakdown since each slat must be rotatable and at the same time allow flow therethrough.

DE 2840024 A1 describes sun protection devices in the form of sun collectors in which the absorber is formed by a fabric or a film through which the adjacent air or applied water is heated. In one embodiment a film collector through which flow can take place is described in which two films are welded or adhesively bonded linearly in such a manner that a snake-like liquid chamber is formed by the weld or adhesion lines.

The object of the present invention is to provide a sun collector which is easy to manufacture and which can be used flexibly, particularly in applications in facade construction.

DESCRIPTION OF THE INVENTION

The object is achieved with the sun collector according to claim 1. Advantageous embodiments of the sun collector are the subject matter of the dependent claims or can be deduced from the following description and the exemplary embodiments.

The proposed sun collector comprises a flat absorber body, hereinafter merely designated as absorber, on or in which one or more absorber channels for the flow of a heat transfer medium are configured. In areas which are not occupied by the one or more absorber channels, the absorber body is provided with penetrable openings for sunlight to pass through. In the present patent application, sun collectors are understood both as elements with glazing and also as elements without glazing.

The present sun collector comprises a static element which, in addition to the collector function, offers partially transparent sun protection. Due to a suitable arrangement of the absorber channels, areas free from absorber channels are formed on the absorber which can be used for sunlight to pass through. In these free areas—or at least a part thereof—penetrable openings are formed for sunlight to pass through. These openings are preferably configured two- or three-dimensionally in such a manner that they provide an angularly selective permeability for the sunlight at which a maximum of the permeability occurs when the angle of incidence of the sunlight to the plane of the absorber body is $\neq 90°$. This makes it possible to achieve protection from glare when the sun is high in the sky, at the same time a view in the horizontal direction and/or downwards also being possible. The openings are thereby incorporated in the absorber by purely local machining so that no stressing or loading of the remaining areas of the absorber occurs due to the production of the openings. This makes it possible to construct the sun collector from an absorber in which the absorber channels are already integrated or on which they are attached, wherein the openings can then be incorporated only subsequently into the absorber without damaging the absorber channels. In this case, the openings can have any geometries, for example, they can be circular or slit-shaped. The absorber itself preferably consists of a flat or curved plate of metal or plastic. In an advantageous embodiment, so-called rollbonded sheets are used as absorbers in which at least some of the channels of the rollbonded sheets are used as absorber channels. The solar-radiation-absorbing effect is achieved in this case by suitable coating of the surface, for example, with a spectrally selective coating having a high solar absorptivity or a high reflectance in the thermal IR.

In the present sun collector, the absorber channels preferably branch multiply, for example, according to a structure such as that obtained by the method described in EP 1525428 B1. A sun collector thus constructed, in which the openings are preferably incorporated as a uniform grid of holes or slits having relatively small diameter, provides an aesthetically pleasing design and is therefore very well suited for facade construction.

The proposed sun collector can also have transparent front-side and rear-side covers in order, for example, to be used as a window element or as a glazed facade element. Thus, for example, the absorber with the absorber channels can be installed between two or more glass panes in particular using usual production technologies in window and glass facade construction.

In a preferred embodiment, the outer side of the absorber is configured to be spectrally selectively reflecting, for example, by means of a suitable coating and the inner side is configured to be diffusely reflecting. The inner side can also be designed to be spectrally selective in this case by suitable treatment or coating. If the absorption function of the sun collectors is given the highest priority, an absorbing, in particular, black configuration can also be selected for the inner side.

In one embodiment, the openings can be incorporated in the absorber by local removal of material of the absorber, for example, by means of punching out, cutting out or drilling. Suitable techniques are laser cutting, laser drilling or water jet cutting.

In another embodiment, the openings are formed by locally bent-out regions of the absorber. During manufacture, the absorber is suitably cut for this purpose so that the openings can be produced by bending out regions of the absorber. The bent-out regions which are usually configured as tab-shaped remain connected to the absorber and are used for light guiding.

The present sun collector is therefore characterised by openings in free regions between the absorber channels which are incorporated in the absorber by purely local machining and therefore do not load the remaining material of the absorber and any absorber channels which have already been attached or integrated during manufacture. The angular selectivity of these penetrable openings can be selected almost freely during manufacture by means of their three-dimensional design so that the sun collector can be produced for the most diverse applications or requirements without major expenditure. In particular, differently configured openings can be provided in different sections of the absorber.

The desired sun protection, viewing, glare protection and daylight provision requirements are satisfied by the specially configured openings.

The sun collector is particularly advantageously suitable for use in the parapet area of buildings since in a suitable embodiment, it offers the possibility of viewing obliquely downwards. This particularly applies to parapet areas of all-glass facades or balcony parapets in house building and non-house building.

The present sun collector can advantageously be used for all facade areas which are glazed, preferably for those areas which do not serve directly for looking out and in which the design plays an important role. Examples of this are horizontal roof skylights, inclined facade or roof elements and in principle, the skylight area and parapet area of a facade. In the winter months the heat obtained with the sun or solar collector can naturally also be pumped to the north side of the building. The heat can also be stored in storey ceilings through which flow takes place, in light-weight construction also in ceilings with phase change material (PCM). It can also be used for inlet air heating by water-air heat exchangers.

In addition to application in office buildings, other applications are naturally also possible, for example, in hotels, clinics or sanatoria with attractive facade designs and a high proportion of glass and/or high requirements for sun protection, at the same time having a high hot water or heating load.

In one embodiment of the present sun collector, the openings are formed by local cutting of the absorber and bending up tab-shaped regions formed by the cutting. The bent-up regions remain connected to the absorber so that different effects of light permeability can be achieved by means of their bending angle or inclination. Thus, in the case of an upright absorber, the tab-shaped regions can be bent, for example, upwards or downwards. Naturally, the absorber must be differently cut for this purpose. An opening can also be formed by bending up several regions. Thus, one opening having an upwardly bent and a downwardly bent tab-shaped region provides almost any adjustability of the ratio of sun protection, viewing, glare protection and daylight provision by means of the bending angle.

In an advantageous embodiment, a metal sheet obtained by means of rollbonding is used as absorber in which some channels are not used as absorber channels but are locally cut and bent up to form the openings. In this way, longer bent-up regions compared with a single sheet can be obtained for the same opening diameter in relation to the bending direction so that the sun protection effect can thereby be increased still further.

In a very advantageous embodiment of the present solar collector, the openings are formed as slits or grooves having a wedge-shaped cross-sectional profile. The slits can run vertically, horizontally or obliquely so that the sun can be blocked out as efficiently as possible. At least one of the two side walls of the wedge shaped slit does not run perpendicularly to the plane of the absorber or to its surface but at an angle of <90°. Here also, the sun protection effect, as well as the viewing angle, the glare protection and the daylight provision can be specifically adjusted by means of the choice of angle of the two side walls and the inside width of the slit perpendicular to the slit direction, hereinafter also designated as gap width, and the thickness of the absorber.

In a further advantageous embodiment of the present sun collector, the openings are configured as drilled holes whose central axis runs at an angle ≠90° to the plane of the absorber or its surface. The sun protection effects required for the respective application can be specifically adjusted by means of the angle of the central axis of the drilled holes, the diameter of the drilled holes and the thickness of the absorber. In this case, it is also possible that some of the drilled holes do not run parallel to one another.

BRIEF DESCRIPTION OF THE DRAWINGS

The present sun collector is explained briefly again hereinafter with reference to exemplary embodiments in conjunction with the drawings. In the figures:

FIGS. 2A-2D show examples for the effect of bent-out elements in one embodiment of the present sun collector;

FIG. 5A and FIG. 5B show a further example for an opening formed by turning, wherein

WAYS OF IMPLEMENTING THE INVENTION

FIGS. 1 to 5 show examples for the configuration of the openings in the absorber in one embodiment of the present sun collector in which the openings are obtained by cutting the absorber and bending up the tab-shaped regions or elements thus formed.

Figure 1A:
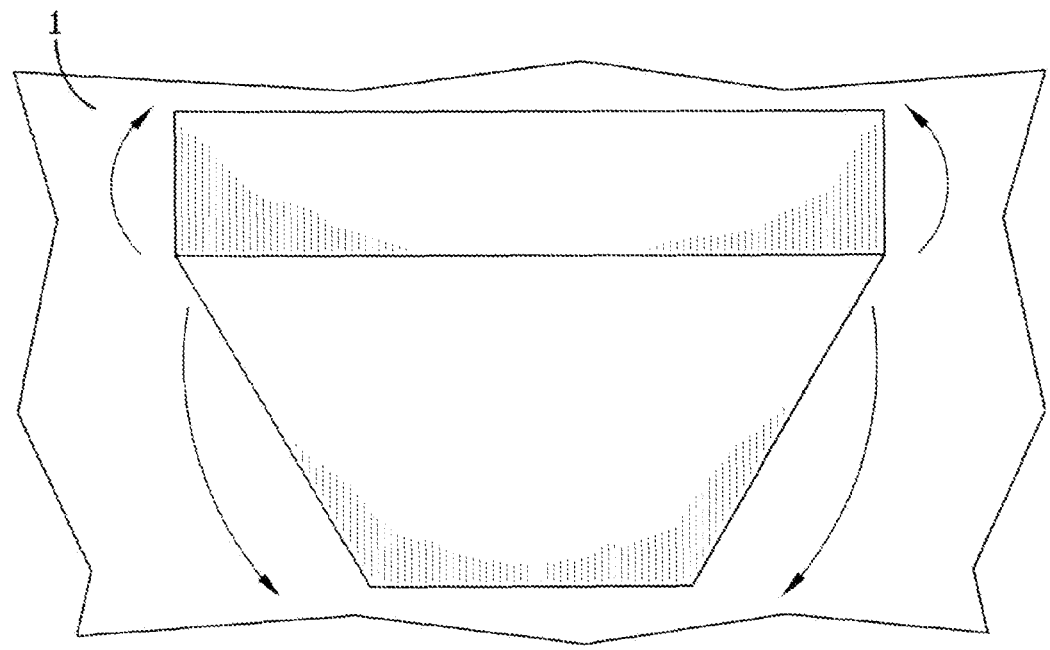
FIG. 1A shows an example for an opening formed by bending-up in one embodiment of the sun collector and FIG. 1B shows an interior of a room as viewed through the opening.
Figure 1B:
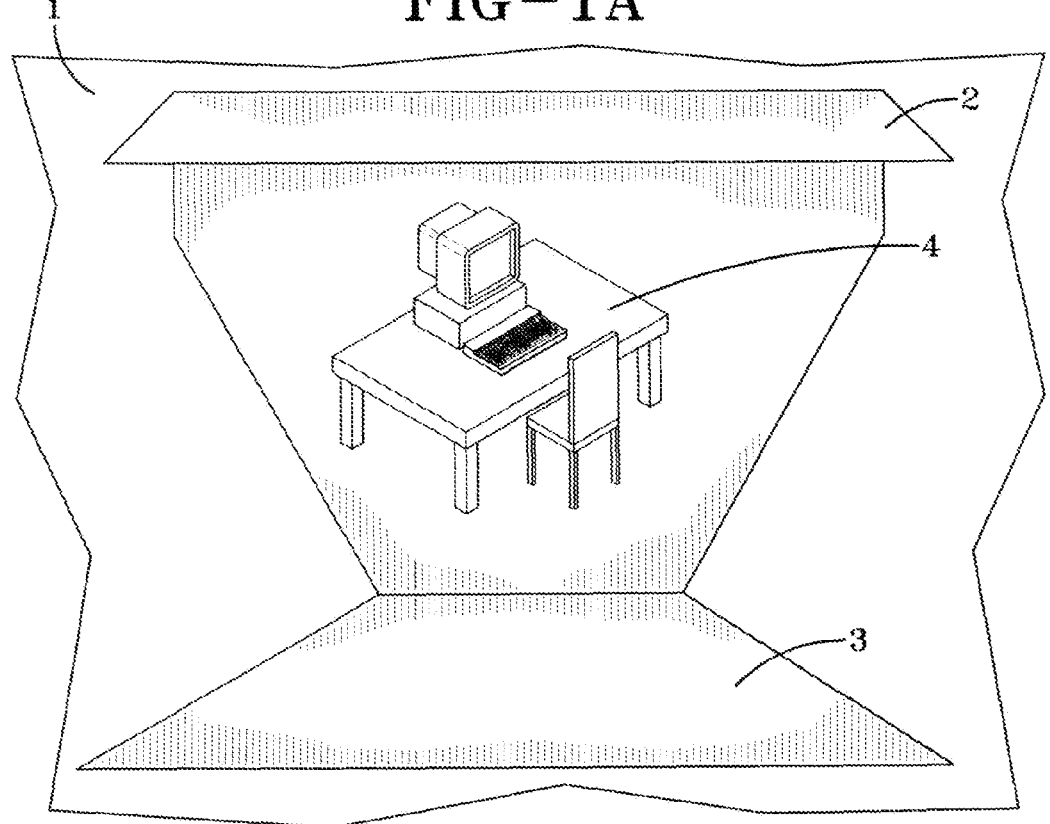
Figure 3B:
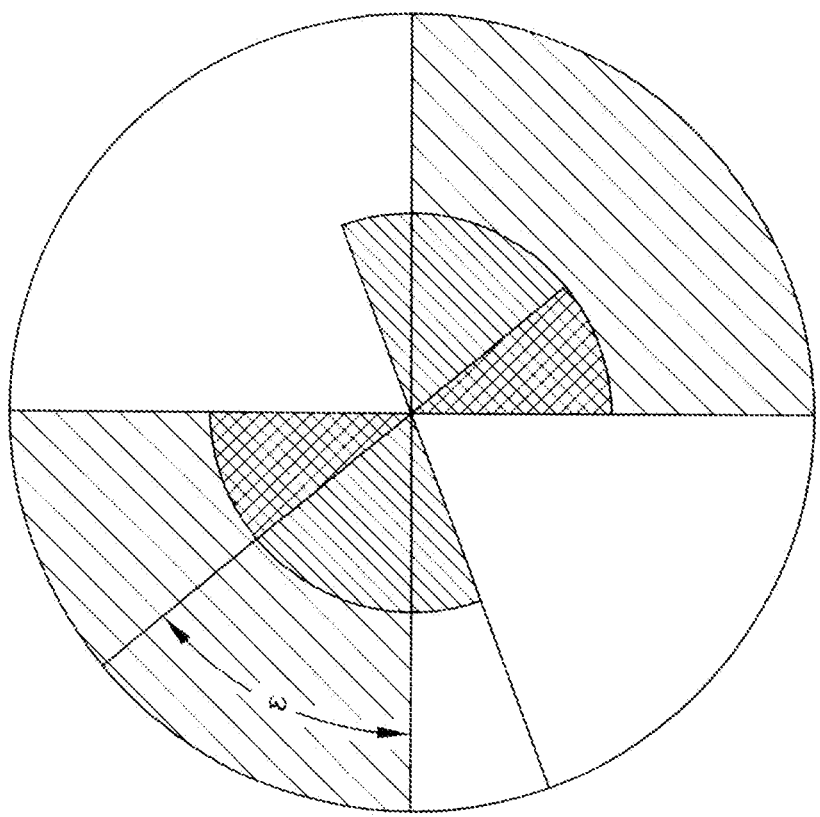
FIGS. 3A-3E show angular regions for bending up the tab-shaped elements.
Figure 3A:
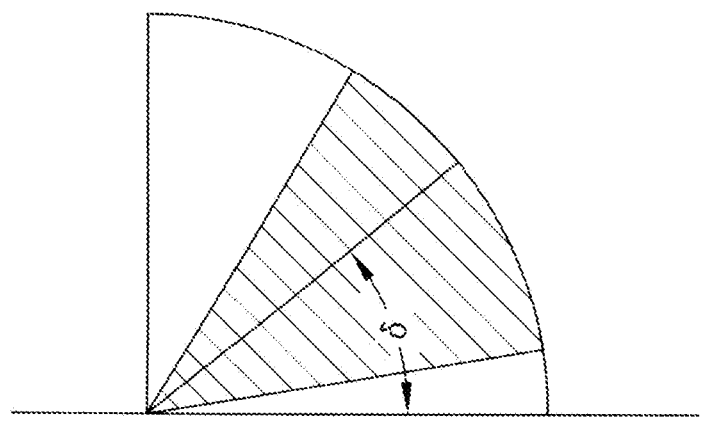
Figure 3E:
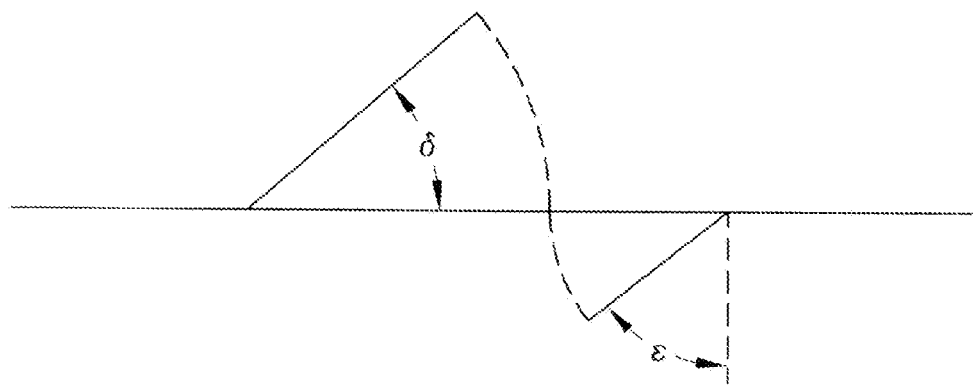
Figure 3D:
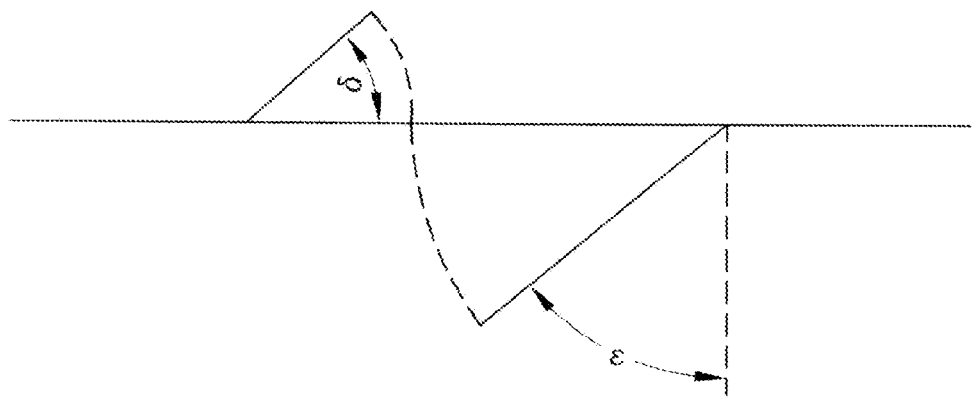
Figure 3C:
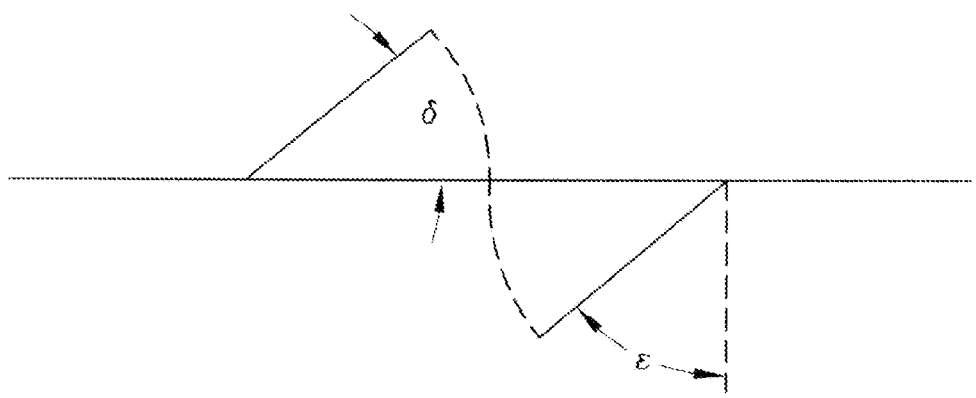

FIG. 1A shows with reference to an example the principle of the cutting and bending out the openings. The metal sheet 1 used as an absorber in this example is cut at the appropriate position of the opening as shown in the left-hand part of the figure. The tab-shaped elements 2, 3 thereby produced are bent out upwards or downwards so that the opening 4 which can be seen in FIG. 1B is formed in the metal sheet 1, said opening being delimited at the top and bottom by the two bent-out elements 2 and 3.

FIGS. 2A-D show different variants for the bending of the tab-shaped elements which lead to different effects in respect of sun protection. All four variants shown have in common that they are formed from a metal sheet 1 by bending out the tab-shaped elements after cutting a corresponding structure into the metal sheet 1. In this case, the orientation of the elements can be horizontal, vertical or inclined. When the sun collector is used on a south-west facade, for example, an inclined arrangement offers the greatest advantage in order to shut out the sun as efficiently as possible. How far the structures must be turned out from the horizontal can be obtained, for example, from the publication of W. Lorenz "A Glazing Unit for Solar Control, Daylighting and Energy Conservation", Solar Energy 70 (2001) No. 2, pp. 109-130, in particular FIG. 2 of this publication. A horizontal arrangement of the bent-out elements is assumed subsequently for illustration.

In the example in FIG. 2A, the tab-shaped element 2 is bent out upwards. The angle δ with respect to the vertical should be between 0° and 90° in this case, preferably in the range between 10° and 60°, and particularly preferably δ=40°. In the example in FIGS. 2A-2D, the instantaneous direction of the solar radiation obliquely incident from the front is indicated by the arrows. The configuration in FIG. 2A allows viewing in the horizontal direction and downwards with simultaneous protection from direct solar radiation. In this and also in the other variants in FIGS. 2A-2D, the inner surface 5 of the absorber is configured to be diffusely reflecting whereas the outer surface is provided with a coating which absorbs the solar radiation.

The example in FIG. 2B shows a variant in which the tab-shaped element 3 is bent out downwards. The bending angle ε with respect to the horizontal in this case lies in the range between −20° and +270°, preferably in the range between 0° and 90° or between 180° and 270°. If the light guidance has the highest priority, an angle of −20°≤ε≤45° or 160°≤ε≤225° is preferred. If glare and sun protection have the highest priority, an angle of 45°≤ε≤90° or 225°≤ε≤270° is preferred.

The bending-out of tab-shaped elements upwards and downwards can also be combined, as shown in FIGS. 2C and 2D. Different effects can be achieved in this case depending on the bending angle and bending direction. The following table shows the effects such as are achieved with the four variants in FIGS. 2A-2D. Here "+" indicates that the corresponding effect is achieved efficiently, "−" indicates that the corresponding effect is not achieved efficiently and "0" indicates that the corresponding effect is achieved partially.

|  | 2A | 2B | 2C | 2D |
| --- | --- | --- | --- | --- |
| Absorption | + | − | 0 | + |
| Viewing | + | 0 | 0 | 0 |
| Room | − | + | + | 0 |
| lighting |  |  |  |  |
| Protection from glare | + | − | 0 | + |
| Sun protection | + | − | 0 | + |

Figures 4A, 4B:
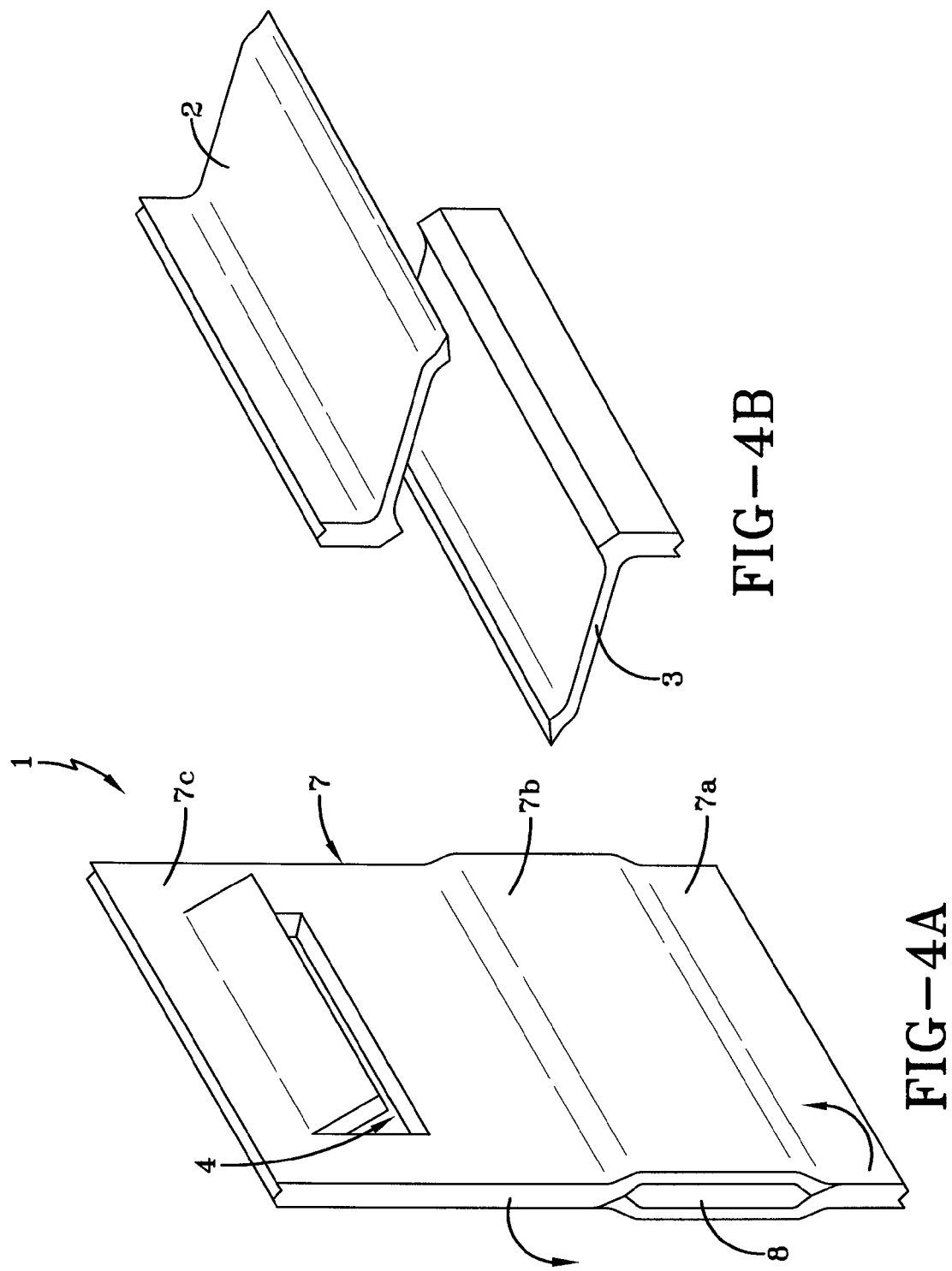
FIGS. 4A and 4B show an example for the use of a roll-bonded sheet as an absorber.

FIG. 4A shows an example in which a metal sheet obtained by rollbonding, a so-called rollbond sheet 7, is used as an absorber 1 which has a number of different types of channels 7a, 7b and 7c. Portions of the sheet 7 not modified in any way are channels 7a. In such a metal sheet, non-welded regions are provided which are inflated by means of compressed air to form closed absorber channels 7b each of which has a channel opening 8, as shown schematically in FIG. 4A. Some of these channels 7b can be used as absorber channels for the heat transfer medium to pass through. The remaining channels 7c are locally cut and bent upwards to form penetrable openings 4. By this means, as shown in FIG. 4B, substantially longer tab-shaped elements 2, 3 with which the sun can be masked out more effectively can be obtained for the same opening diameter compared with a simple metal sheet. The sharp outer edge of these elements is very advantageous for reasons of protection from glare since no highlights can be formed at this point. In principle, better room lighting is achieved due to the diffuse reflection of the sunlight at the downwardly bent elements 3.

FIGS. 3A-3E show the angles δ and ε and their preferred regions. A preferred region is formed within each entire region shown, this being indicated by single hatching. The particularly preferred region for light deflection is shown in bold-hatching, the particularly preferred region for glare and sun protection is shown in cross-hatching.

Figure 5B:
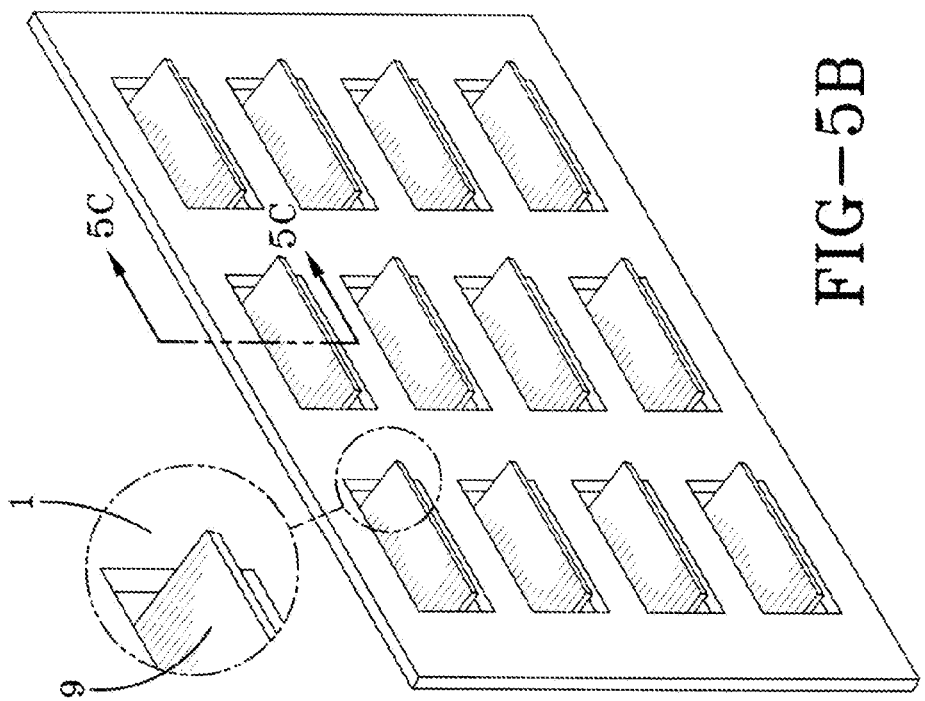
Figure 5A:
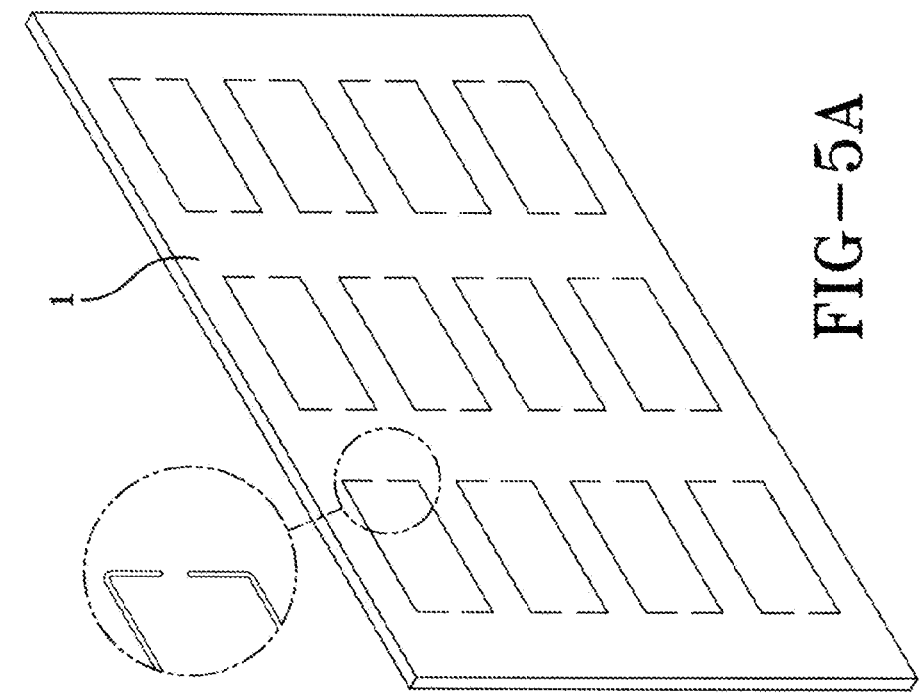
Figure 5C:
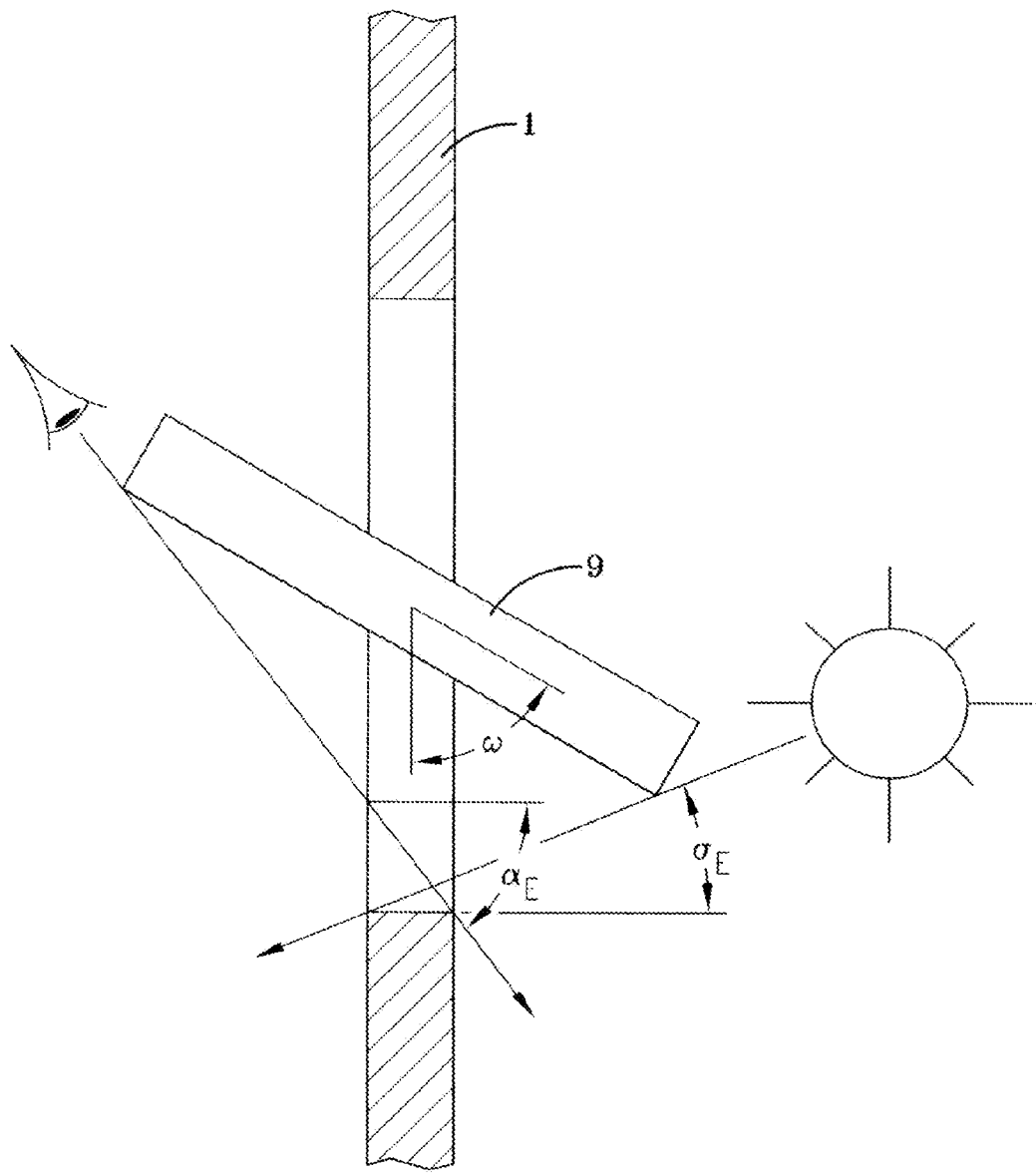
FIG. 5C shows a cross-sectional view taken along line 5C-5C in FIG. 5B.

FIGS. 5A-5C show another example for openings which were produced by bending up cut regions of sheet metal. In this case, the metal sheet 1 was cut in a U-shape on both sides of an opening axis, as can be seen in FIGS. 5A-5B, so that the tab-shaped elements can be turned out like a slat 9. This is illustrated in cross-section in FIG. 5C. In this way, slats 9 are obtained similar to a Venetian blind. Several slats can also be arranged directly amongst one another. For the angular range $\sigma_E$ in this case it holds that 0°≤$\sigma_E$≤80°, preferably 0°≤$\sigma_E$≤45°, particularly preferably 5°≤$\sigma_E$≤25°.

Figure 6A:
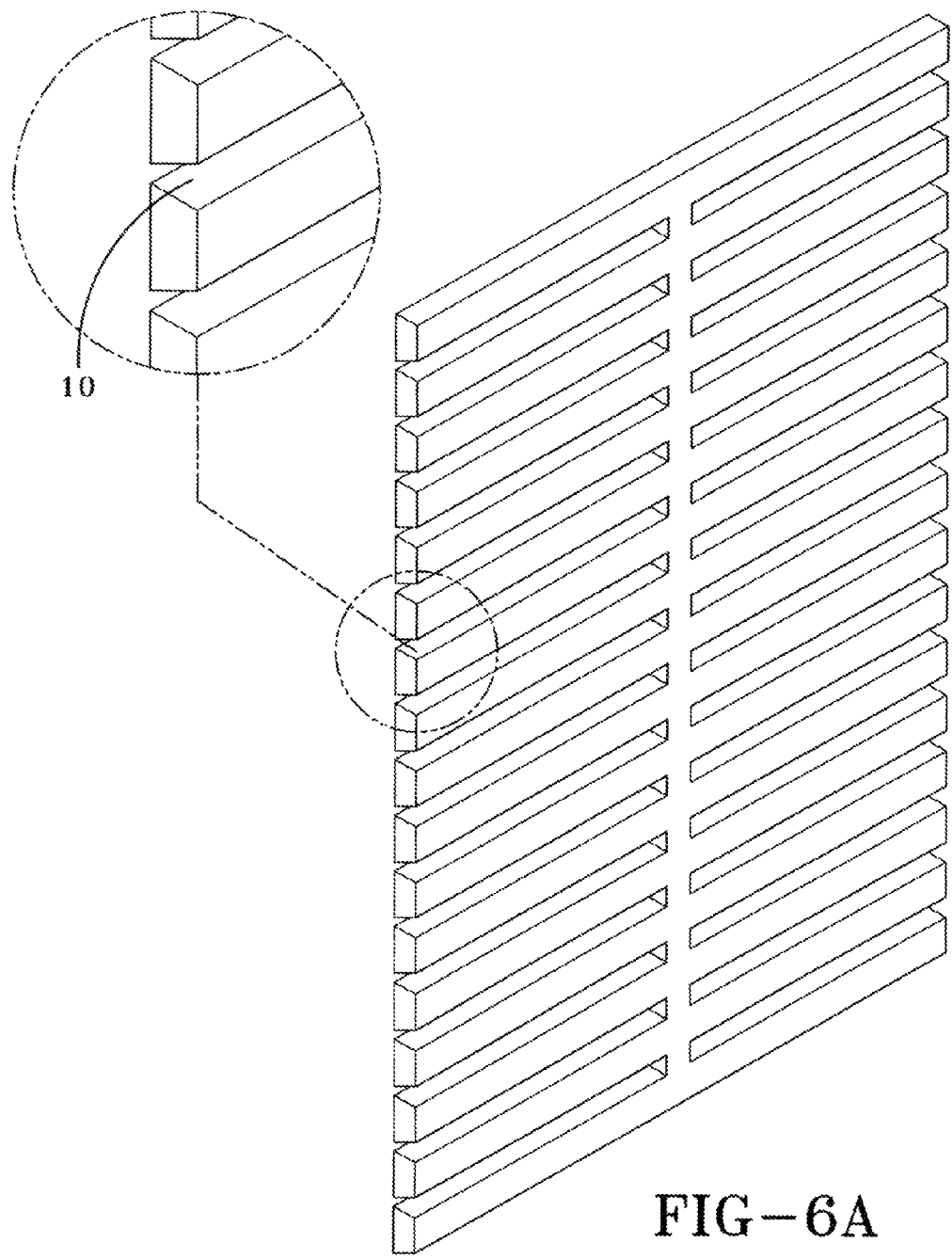
FIG. 6A and FIG. 6B show an example for an embodiment of the present sun collector with wedge-shaped slits as openings.
Figure 6B:
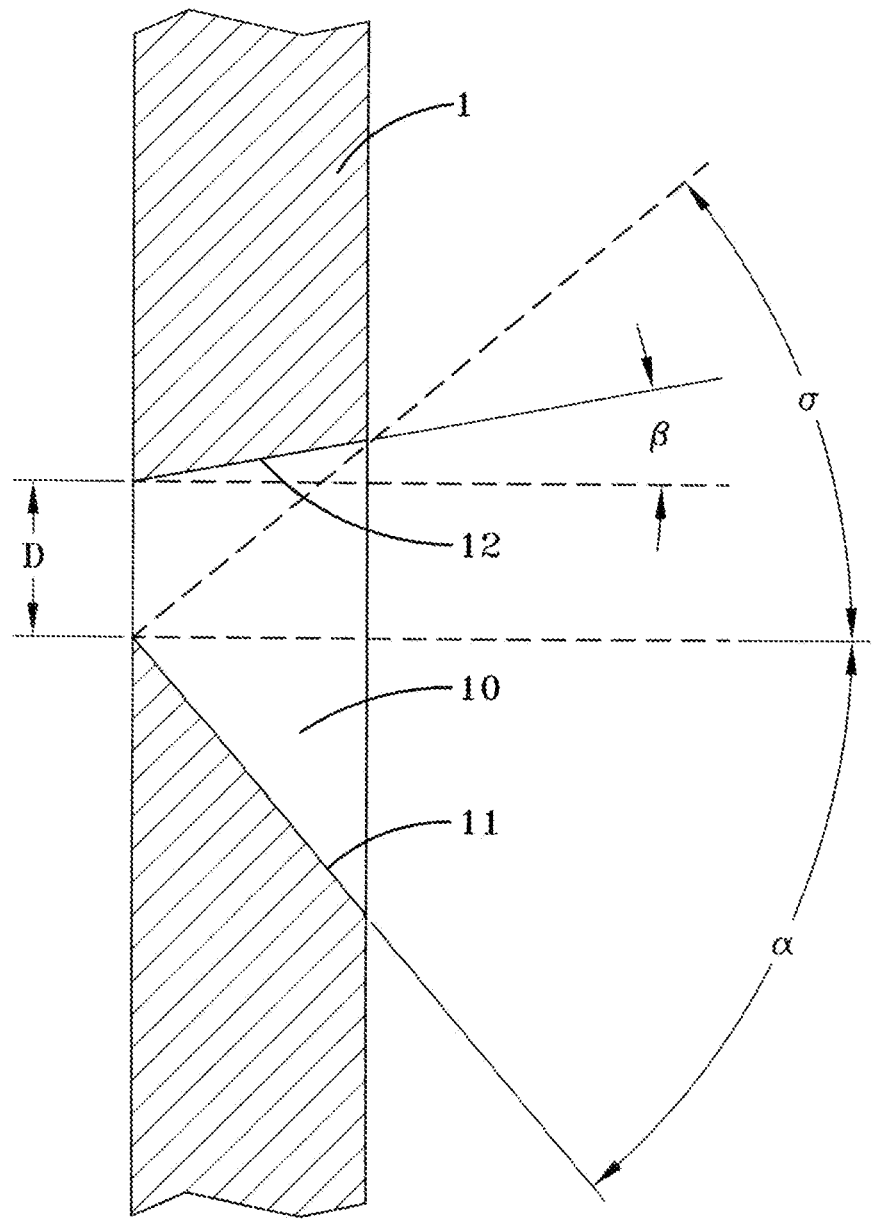

FIGS. 6A and 6B show another possibility for configuring the present sun collector in which the angularly selective sun protection structure is not formed by bending out sheet metal elements but by cutting out wedge-shaped longitudinal grooves 10. This can be accomplished for example, by means of laser cutting. The grooves 10 can run vertically, shown generally in FIG. 6A, horizontally or obliquely so that the sun is masked out as efficiently as possible. An oblique arrangement is advantageous on a south-west facade (cf. publication of W. Lorenz loc. cit.). Horizontal grooves are assumed subsequently for illustration. In this case, as seen in FIG. 6B, the lower side wall 11 of the groove 10 is advantageously bevelled outwardly downwards to allow viewing downwards. The angles α and β are measured with respect to the horizontal. The masking-out angle for the sun is denoted by σ. The angle α is preferably between 0° and 85°, the angle β, which gives the inclination of the upper side wall 12 with respect to the horizontal, is preferably between −20° and +10°.

Usually, the requirements for protection from glare and viewing outwards have a higher priority than the daylight provision of the room. Perturbing reflections should therefore be avoided in any case. The lower side wall 11 should therefore be turned more steeply than 45° from the horizontal ($\alpha \geq 45°$), so that horizontally incident sunlight is not deflected inwards but upwards. Light having a higher elevation angle is then reflected outwards because the angle of incidence is equal to the angle of reflection. The angular information for $\alpha$ applies regardless of the inclination of the facade on which the sun protection device is attached. They are only derived from the possible sun positions.

If the daylight provision has a higher priority, for example in the upper segment of a ribbon window or above head height, the light should be reflected into the room (i.e. $\alpha < 45°$). This angular information for $\alpha$ applies regardless of the inclination of the facade but is derived from the possible sun positions at the respective attachment location.

The upper side wall 12 should thus advantageously be inclined upwards by the angle $\beta$ with respect to the horizontal so that for most of the time the direct sun cannot shine directly into the room grazing along the surface ($-20° \leq \beta \leq 10°$). The angle $\beta$ is particularly preferably selected so that: $-10° \leq \beta \leq 0°$. Variants with $|\beta| > 10°$ are likewise possible. The angular information for $\beta$ applies regardless of the inclination of the facade. It is merely derived from the possible sun positions.

Another parameter for adjusting the glare protection effect is the gap width D which gives the inside width on the inner side of the groove 10. Thus, D specifies the sun profile angle $\alpha_p = \sigma$ from which the sun can shine directly through the grooves or gaps in the absorber. The profile angle is the projection of the sun elevation angle onto a vertical plane perpendicular to the absorber. If a facade azimuth=solar azimuth, the profile angle agrees with the elevation angle of the sun. The gap width can therefore be specified in this special case as is also illustrated, for example, in FIG. 7B. Regardless of the inclination of the facade, the gap width should be selected so that the direct sun is masked out from a profile angle of $-20° \leq \alpha_p = \sigma \leq 70°$, preferably $0° \leq \alpha_p = \sigma \leq 45°$ and particularly preferably $5° \leq \alpha_p = \sigma \leq 25°$.

Figure 7A:
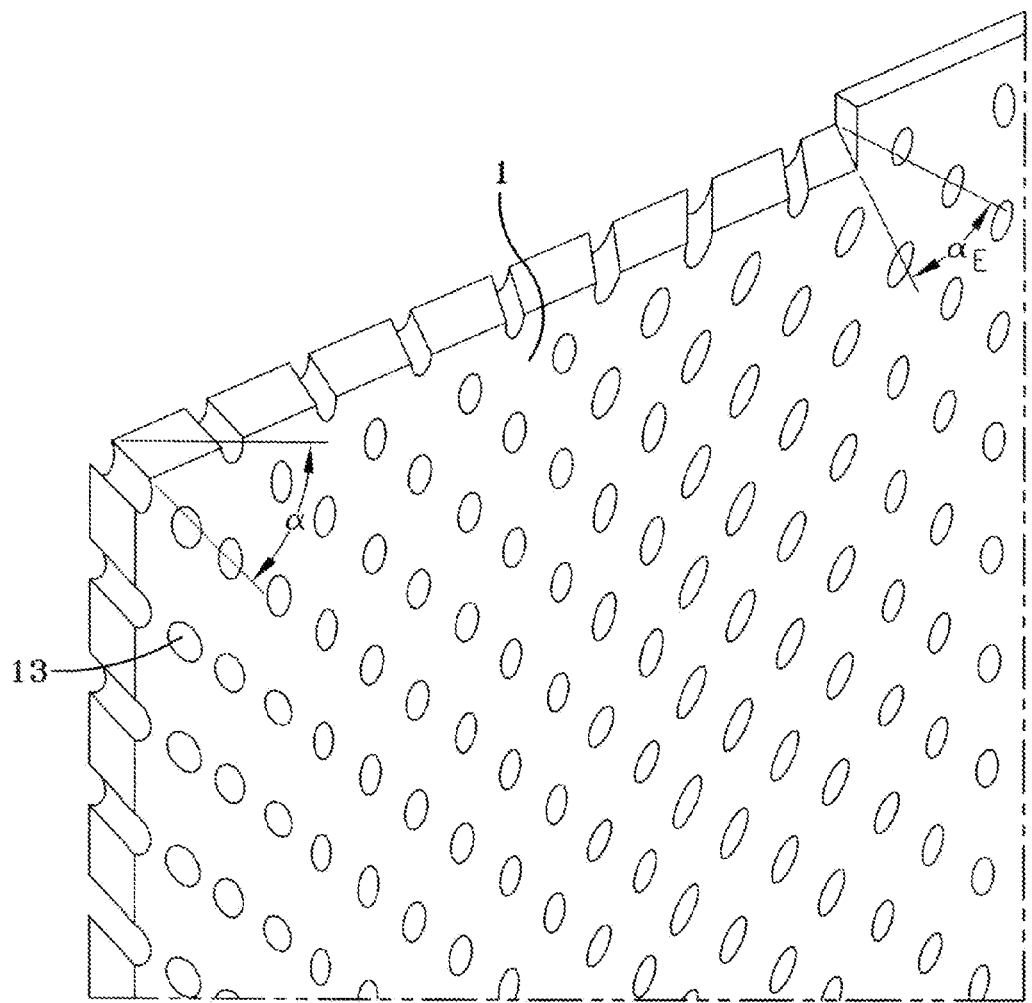
FIG. 7A and FIG. 7B show an example for an embodiment of the sun collector with circular holes as openings.
Figure 7B:
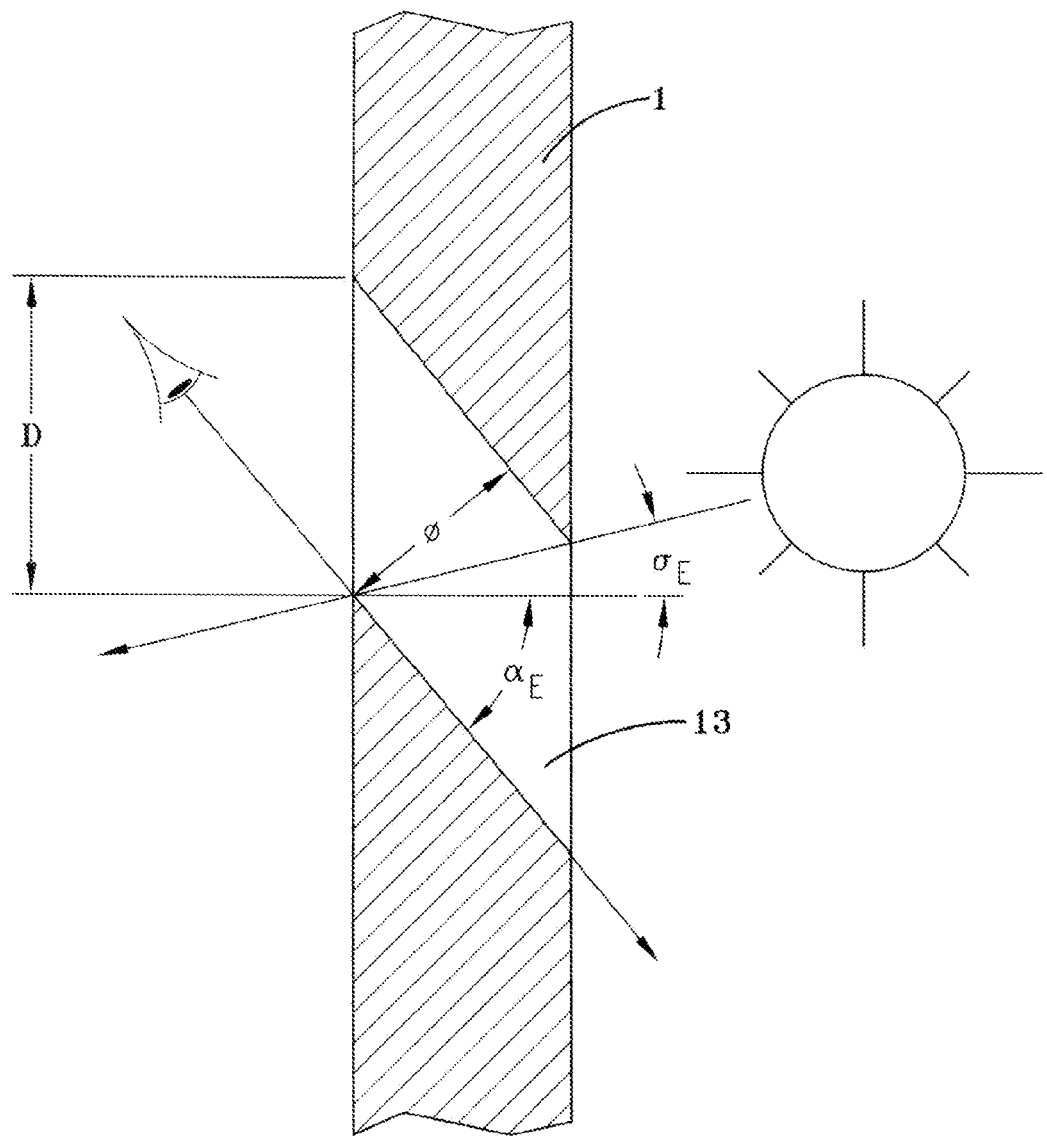

On this matter, FIG. 7A shows a further example of the present sun collector in which the openings are formed by obliquely drilled holes 13. These holes 13 can be produced, for example, by means of a laser. The holes 13 advantageously point obliquely downwards in order to allow viewing in this direction.

If high requirements for protection from glare exist, it is expedient to initially incorporate the holes 13 in the absorber 1 and then coat the absorber 1 spectrally selectively or matt black so that the wall of the drilled hole or hole 13 upon which the sun shines is likewise coated. With the angles defined in the right-hand part of the FIG. 7, it holds that: $\emptyset = t * \cos(\alpha_E) * (\tan((\alpha_E) + \tan(\alpha_E))$. For a given sheet metal thickness t or thickness of the absorber and desired angles $\alpha$ and $\sigma$, the necessary hole diameter $\emptyset$ is thus obtained.

In many cases, it is appropriate if the holes 13 are not parallel so that a certain transparency also exists laterally. However, the directions of the central axes of the holes 13 are advantageously all contained in one plane which is turned downwards by the angle $\alpha_E$ from the horizontal and has a horizontal line of intersection with the absorber (cf. FIG. 7B).

The angular ranges given below for $\alpha_E$ are also valid for non-vertical facades (for example, for roof windows) since $\alpha_E$ is only derived from the position of the sun and not from the inclination of the facade. Thus, $\alpha_E$ is defined with respect to the horizontal regardless of the inclination of the absorber body. In the case of non-south-facing facades, it is advantageous if the line of intersection with the absorber is not horizontal but is inclined so that the sun is masked out as efficiently as possible.

For the angular range of $\alpha_E$, it holds that $-20° \leq \sigma_E \leq 80°$, preferably $0° \leq \sigma_E \leq 45°$ and particularly preferably $5° \leq \sigma_E \leq 25°$.

For the angular range of $\alpha_E$, it holds that: $0° \leq \alpha_E \leq 85°$. If high requirements for protection from glare exist, $\alpha_E$ is preferably $>45°$ because directly incident radiation is then reflected outwardly upwards. Horizontally incident radiation is reflected perpendicularly upwards when $\alpha_E = 45°$. High requirements for protection from glare usually exist because viewing can be impaired by scattered light.

If high requirements for protection from glare do not exist and daylight usage is important, the angle $\alpha_E$ is then $<45°$ because externally incident direct radiation then tends to be guided inwards onto the ceiling. The smaller $\alpha_E$, the more light is guided inwards.

Figure 8:
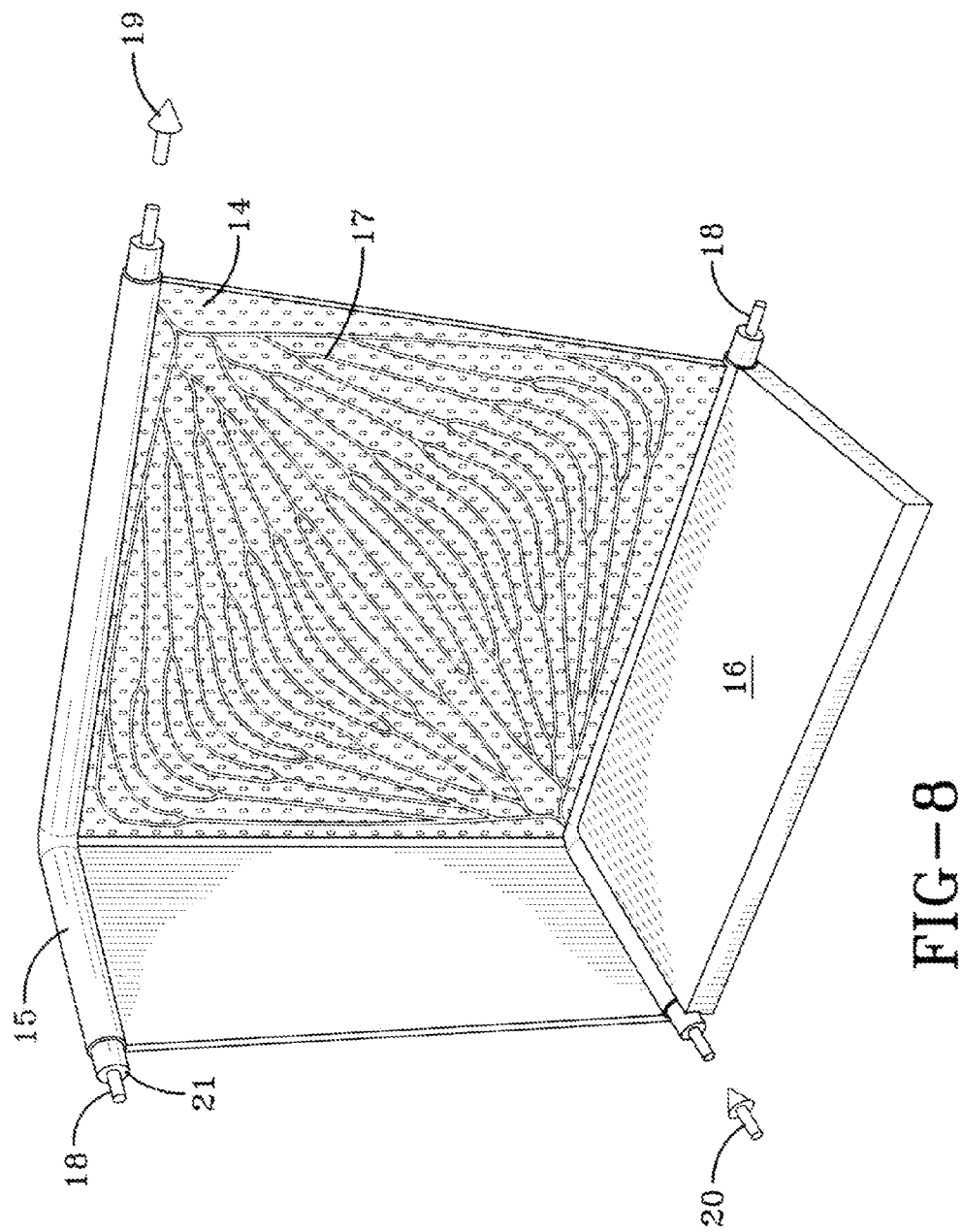
FIG. 8 shows an example for the use of the sun collector as a balcony parapet.

FIG. 8 shows an example in which the proposed sun collector is used as a balcony parapet. In this embodiment one or more of the sun collectors 14 are mounted between the handrail 15 and the base plate 16 of the balcony. Each sun collector 14 includes a plurality of absorber channels 17, which are connected in parallel to the collecting channels 18 for transferring the heat transfer medium by the return 20 and the flow 19 which are ensheathed by thermal insulation 21 and jacket pipe. The latter at the same time serves as a handrail 15 for example, made of stainless steel so that it fulfils two functions and thus allows an aesthetic solution for providing the infrastructure required for operation of the collector. The openings are configured in this case so that viewing obliquely downwards is possible but permeability for sunlight above a solar angle of 25° is prevented.

If the balcony is suitably aligned, the absorbers connected in parallel can also be at angles to one another. Thus, for example, in the configuration shown in the figure, a further absorber could be installed between the glass panes shown on the left in the area of the return.

The proposed sun collector can be used particularly advantageous for solar cooling, in particular in office buildings having high internal loads. It can also be used for solar sorption-assisted air conditioning. An increase in temperature can possibly be accomplished by a downstream high temperature sun collector or by means of conventional after heating. The solar cooling can also be accomplished only according to floor, for example for cooling a seminar room. Thus, space- and cost-intensive installations over several storeys can be eliminated. The simultaneous nature of cooling load and collector yield favours this application. The sun protection at the same time reduces the internal thermal loads. The remaining cooling requirement can be met by the solar cooling.

Figure 9:
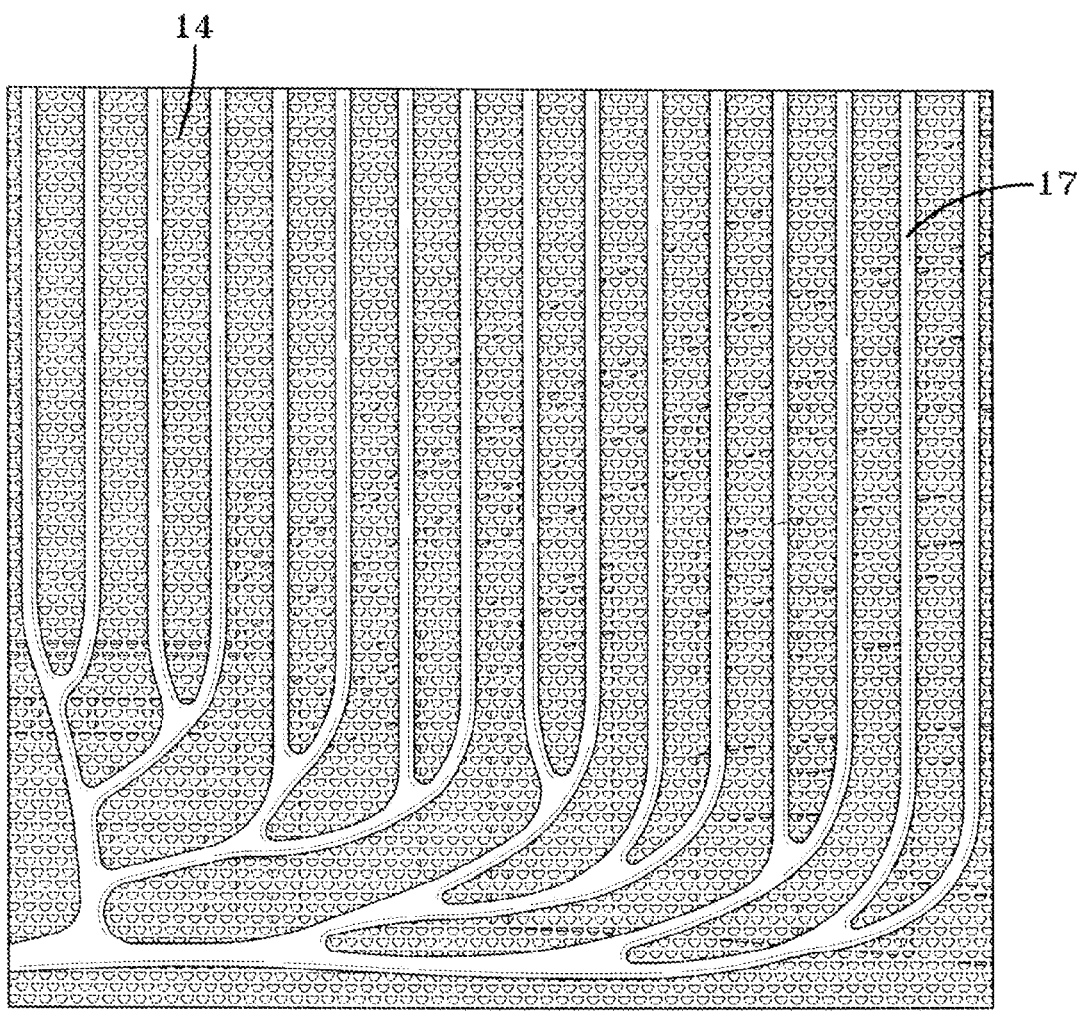
FIG. 9 shows an example for the visual impression of the sun collector.
Figure 10:
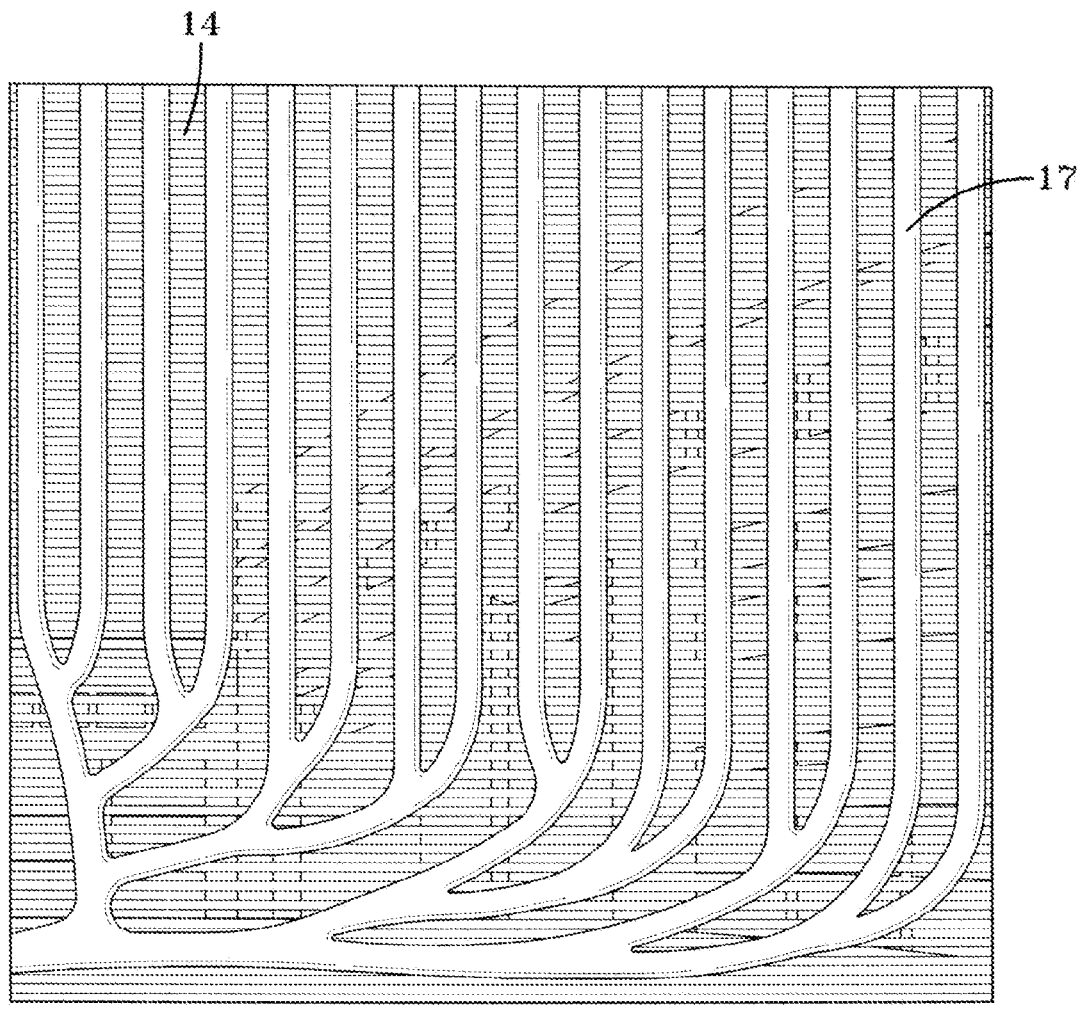
FIG. 10 shows another example for the visual impression of the sun collector.

FIGS. 9 and 10 show two embodiments of the sun collector 14 with different optics. In the embodiment in FIG. 9, trapezoidal openings are incorporated in the absorber. The embodiment in FIG. 10 shows the visual impression when the solar collector is configured with fine slits as openings. In both embodiments, the absorber channels 17 form an aesthetically pleasing multiply branched structure. As in other embodiments, the absorber channels can be soldered or welded onto the absorber as separate pipes or, for example, using a rollbond metal sheet, integrated in the absorber.

Figure 11:
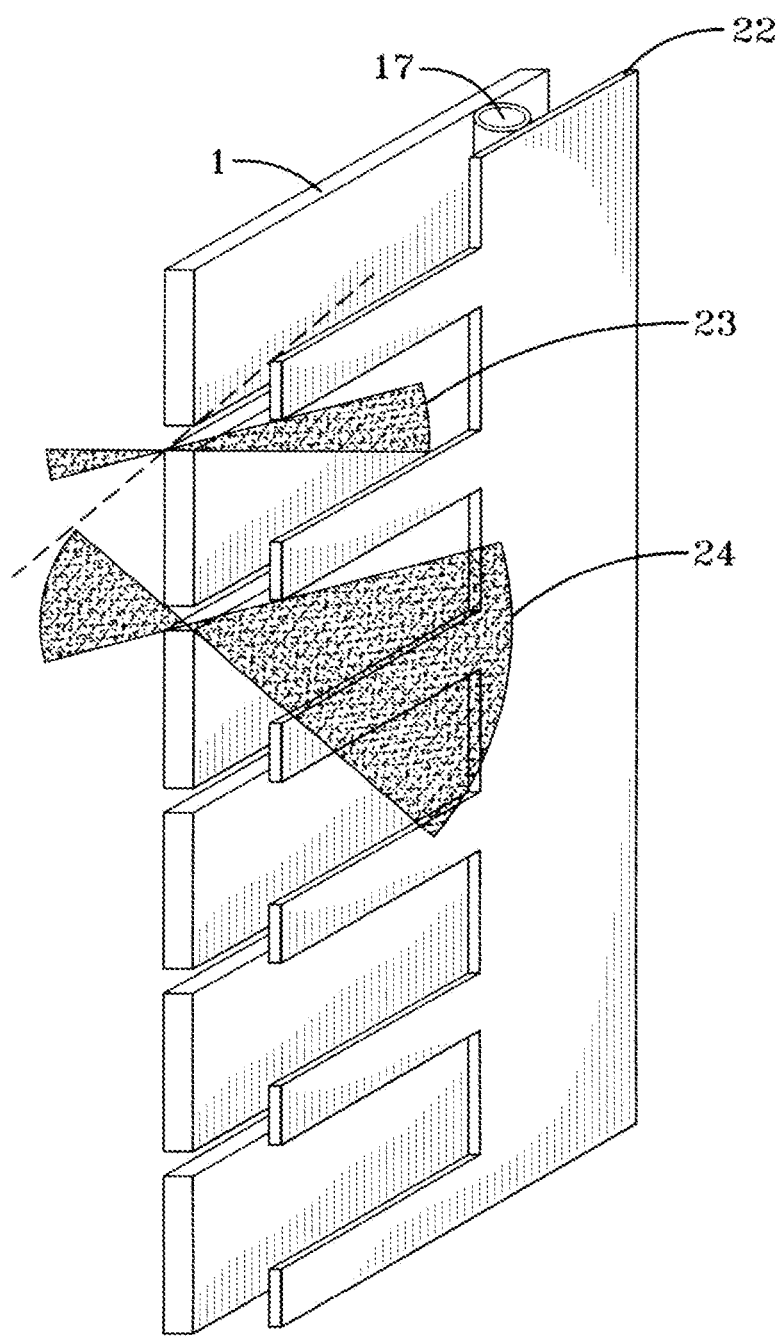
FIG. 11 shows another example for the structure of the sun collector.

FIG. 11 shows another example for the structure of the sun collector in which a second absorber metal sheet 22 on one side of the sun collector is in thermal contact with the absorber channels 17. In this sandwich design, the further absorber metal sheet 22 can be soldered or welded on. Due to the slits provided in the further absorber metal sheet 22, in cooperation with the slits in the other absorber metal sheet 1, an angularly selective permeability is achieved for the sunlight.

In this example, the absorber metal sheet 22 on the side facing the sun (primary absorber) has a spectrally selective coating in the same way as the other absorber metal sheet 1 (secondary absorber). The absorber channel 17 can form a unit with the absorber metal sheet 1 in the case of a rollbond absorber. The region indicated by the reference numeral 23 corresponds to the area of the sunlight which is not masked out, i.e. which can shine through the slits. The region indicated by the reference numeral 24 corresponds to the region of viewing from inside (left side: inside; right side: outside).

The dashed line shows that the geometry is designed so that solar rays having smaller profile angles (flatter) are incident on the primary absorber and those having larger profile angles (steeper) are incident on the secondary absorber. The dashed line represents the limiting case; this contacts the lower edge of the slit of the primary absorber facing away from the sun, the upper edge facing the sun and the lower edge of the secondary absorber facing away from the sun. The sun can therefore only shine through the slits in the region of 23 (theoretically obliquely from below but this is only relevant for inclined collectors). It is important that the absorber channels 17 are in very good thermal contact with primary and secondary absorber so that the efficiently produced heat can be removed.

REFERENCE NUMERALS

1 Metal sheet
2 Upper tab-shaped element
3 Lower tab-shaped element
4 Opening
5 Diffusely reflecting inner surface
6 Absorbing coating
7 Rollbond sheet metal
8 Channel
9 Slat
10 Wedge-shaped grooves
11 Lower side wall
12 Upper side wall
13 Holes
14 Sun protection device
15 Handrail
16 Base plate
17 Absorber channels
18 Collecting channels
19 Flow
20 Return
21 Thermal insulation
22 Further absorber metal sheet
23 Region of sunlight which is not masked out
24 Region of viewing from inside

The invention claimed is:

1. A sun collector comprising
a flat absorber body on or in which one or more closed absorber channels for the flow of a fluid heat transfer medium therein are configured,
characterised in
that in areas which are not occupied by the one or more closed absorber channels, the absorber body has penetrable openings for sunlight to pass through and that the absorber body is disposed between a front-side transparent cover and a rear-side transparent cover,
wherein the penetrable openings have an angularly selective permeability for the sunlight at which a maximum of the permeability occurs when the angle of incidence of the sunlight to the plane of the absorber body is ≠90°.

2. The sun collector according to claim 1,
characterised in
that the openings are incorporated by purely local processing in the absorber body or by local removal of material of the absorber body.

3. The sun collector according to claim 1,
characterised in
that the closed absorber channels branch many times in or on the absorber body.

4. The sun collector according to claim 1,
characterised in
that the absorber body is formed from a metal sheet produced by means of rollbonding, wherein at least some of a plurality of channels formed in the metal sheet form the closed absorber channels.

5. The sun collector according to claim 1,
characterised in
that in areas that are not occupied by one or more closed absorber channels, the absorber body is perforated in matrix form with round or polygonal-shaped or slit-shaped openings.

6. The sun collector according to claim 2,
characterised in
that the openings are slits having a wedge-shaped cross-sectional profile, in which at least one side wall does not run perpendicularly to a surface of the absorber body.

7. The sun collector according to claim 2,
characterised in
that the openings are holes having central axes which do not run perpendicularly to a surface of the absorber body.

8. The sun collector according to claim 1,
characterised in
that the openings are formed by local cutting into the absorber body and bending up tab-shaped regions thus formed.

9. The sun collector according to claim 8,
characterised in
that in an absorber body made of a metal sheet produced by means of rollbonding, wherein at least some of a plurality of channels formed in the metal sheet are locally cut up and bent up to form the openings.

10. The sun collector according to claim 8 or 9,
characterised in
that at least some of the tab-shaped regions are bent out by an angle to a first lateral edge of the absorber body, which lies between 5° and 90°, to the plane of the absorber body.

11. The sun collector according to claim 8 or 9,
characterised in
that when the absorber body is positioned vertically, at least some of the tab-shaped regions are bent out upwards by an angle which is selected in such a manner that in a section of the relevant openings with a vertical plane perpendicular to the absorber body, a rectilinear connecting line between a lower edge of the opening on a side of the absorber body and an upper edge of the opening on an opposite side of the absorber body is at angle to the normal on the absorber body which is between 0° and 45°.

12. The sun collector according to claim 8,
characterised in
that at least some of the tab-shaped regions are bent out to a second lateral edge of the absorber body by an angle which lies between −20° and 270° to the perpendicular on the plane of the absorber body.

13. The sun collector according to claim 12,
characterised in
that the angle by which the tab-shaped regions are bent out towards the second lateral edge of the absorber body lies in the region between 0° and 90° or between 180° and 270° or between −20° and +45° or between 160° and 225° or between 45° and 90° or between 225° and 270°.

14. The sun collector according to claim 12,
characterised in
that the second lateral edge lies opposite to the first lateral edge or forms a lower lateral edge of the absorber body, wherein for at least some of the openings a first tab-shaped region is bent out towards the first lateral edge or upwards and a second tab-shaped region is bent out towards the second lateral edge.

15. The sun collector according to claim 6,
characterised in
that at least in some of the slits, a first side wall runs at an angle of ≥45° or at an angle of <45° to the perpendicular to the plane of the absorber body.

16. The sun collector according to claim 15,
characterised in
that a second side wall runs at an angle between −10° and 0° to the perpendicular to the plane of the absorber body.

17. The sun collector according to claim 6,
characterised in
when the absorber body is positioned vertically, angles by which the an upper side wall and a lower side wall run to the normal to the plane of the absorber body are selected in such a manner that in a section of the relevant slits with a vertical plane perpendicular to the absorber body and to a longitudinal direction of the slit, a rectilinear connecting line between a lower edge of the slit on one side of the absorber body and an upper edge of the slit on an opposite side of the absorber body is at an angle to the normal to the absorber body which is between 0° and 45°, preferably between 5° and 25°.

18. The sun collector according to claim 6, 15, 16 or 17,
characterised in
that a gap width of the slit is selected in such a manner that when the absorber body is positioned vertically, in a section of the relevant slit with a vertical plane perpendicular to the absorber body and to a longitudinal direction of the slit, a rectilinear connecting line between a lower edge of the slit on one side of the absorber body and an upper edge of the slit on an opposite side of the absorber body is at an angle to the normal to the absorber body which is between 0° and 45°, preferably between 5° and 25°.

19. The sun collector according to claim 7,
characterised in
that when the absorber body is positioned vertically, the central axes of the holes run in such a manner that in a parallel projection of the holes parallel to the plane of the absorber body onto a vertical projection plane perpendicular to the absorber body, the projections of the central axes are parallel to one another and that in the parallel projection, a rectilinear connecting line between a lower edge of the respective hole on one side of the absorber body and an upper edge of the hole on an opposite side of the absorber body is at an angle to the normal to the absorber body which is between 0° and 45°, preferably between 5° and 25°.

20. The sun collector according to claim 19,
characterised in
that at least some of the holes do not run parallel.

21. The sun collector according to claim 20,
characterised in
that the holes are arranged in rows and the central axes of the holes in each row each lie in one plane.

22. The sun collector according to claim 7, 19, 20 or 21,
characterised in
that a diameter of the holes is selected in such a manner that when the absorber body is positioned vertically, in a parallel projection of the holes parallel to the plane of the absorber body onto a vertical projection plane perpendicular to the absorber body, a rectilinear connecting line between a lower edge of the respective hole on one side of the absorber body and an upper edge of the hole on an opposite side of the absorber body is at an angle to the normal on the absorber body which is between 0° and 45°, preferably between 5° and 25°.

23. The sun collector according to claim 1,
characterised in
that the closed absorber channels on one side are in thermal contact with another absorber body which has further penetrable openings for sunlight to pass through, wherein the further openings are arranged in such a manner and configured so that by cooperating with the openings in the other absorber body, they achieve an angularly selective permeability of the sun collector to sunlight.

24. The sun collector according to claim 1,
characterised in
that the side of the absorber body facing the sun is configured or coated to absorb solar radiation, in particular in a spectrally selective manner.

25. The sun collector according to claim 24,
characterised in
that the side of the absorber body facing away from the sun is configured or coated to absorb solar radiation.

26. The sun collector according to claim 24,
characterised in
that the side of the absorber body facing away from the sun is configured or coated to be reflecting, in particular diffusely or spectrally selectively reflecting.

27. The sun collector according to claim 1,
characterised in
that the front-side and/or the rear-side transparent covers mainly consist of glass or plastic.

28. The sun collector according to claim 27,
characterised in
that the front-side and/or the rear-side transparent covers consist of a heat-insulating material.

29. The sun collector according to claim 27,
characterised in
that the front-side and/or the rear-side transparent covers consist of an insulating glazing.

30. The sun collector according to claim 27,
characterised in
that the front-side and/or the rear-side transparent covers are formed by a film.

31. The sun collector according to claim 27,
characterised in
that the front-side and/or the rear-side transparent covers form a gastight cavity which is filled with an inert gas.

32. The sun collector according to claim 27,
characterised in
that the front-side and/or the rear-side transparent covers form a gastight cavity which is back-ventilated towards the outside.

33. The sun collector according to claim 27, characterised in
that the front-side and/or the rear-side transparent covers form a gastight cavity which is evacuated and supported with spacers between the covers.

34. The sun collector according to claim 31, characterised in
that an inner side of the front-side and/or the rear-side transparent cover is provided with a low-emitting layer, in particular based on a non-weathering-resistant soft coating.

35. The sun collector according to claim 31 or 34, characterised in
that the rear-side transparent cover consists of a multiple insulating glazing in which an inner side of an outermost pane of the insulating glazing is provided with a low-emitting layer based on a non-weathering-resistant soft coating.

36. The sun collector according to claim 8 or 9, characterized in
that at least some of the tab-shaped regions are bent out by an angle to a first lateral edge of the absorber body, which lies between 10° and 50° to the plane of the absorber body.

37. The sun collector according to claim 8 or 9, characterized in
that when the absorber body is positioned vertically, at least some of the tab-shaped regions are bent out upwards by an angle which is selected in such a manner that in a section of the relevant openings with a vertical plane perpendicular to the absorber body, a rectilinear connecting line between a lower edge of the opening on a side of the absorber body and an upper edge of the opening on an opposite side of the absorber body is at angle to the normal on the absorber body which is between 5° and 25°.

* * * * *

UNITED STATES PATENT AND TRADEMARK OFFICE
CERTIFICATE OF CORRECTION

PATENT NO. : 8,607,781 B2  Page 1 of 1
APPLICATION NO. : 12/306039
DATED : December 17, 2013
INVENTOR(S) : Hermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this
Twenty-second Day of September, 2015

Michelle K. Lee
*Director of the United States Patent and Trademark Office*